(12) United States Patent
Army Jr. et al.

(10) Patent No.: US 7,000,425 B2
(45) Date of Patent: Feb. 21, 2006

(54) MANIFOLD FOR PACK AND A HALF CONDENSING CYCLE PACK WITH COMBINED HEAT EXCHANGERS

(75) Inventors: Donald E. Army Jr., Enfield, CT (US); Douglas L. Christians, Vernon, CT (US); Frederick Peacos, III, Ellington, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 277 days.

(21) Appl. No.: 10/405,099

(22) Filed: Apr. 1, 2003

(65) Prior Publication Data

US 2004/0194493 A1 Oct. 7, 2004

Related U.S. Application Data

(63) Continuation-in-part of application No. 10/387,139, filed on Mar. 12, 2003.

(51) Int. Cl.
*F25D 9/00* (2006.01)
*F25B 9/00* (2006.01)

(52) U.S. Cl. .................. 62/401; 62/87; 137/625.19; 137/595

(58) Field of Classification Search .................. 62/401, 62/402, 86, 87, 172; 137/625.18, 625.19, 137/595
See application file for complete search history.

(56) References Cited

U.S. PATENT DOCUMENTS

| 1,664,909 | A | * | 4/1928 | Thomson | 137/886 |
|---|---|---|---|---|---|
| 2,154,945 | A | * | 4/1939 | Kyes | 137/887 |
| 2,215,046 | A | * | 9/1940 | Kramhoft | 62/335 |
| 2,981,082 | A | * | 4/1961 | Sixsmith | 62/401 |
| 5,167,254 | A | * | 12/1992 | Walter et al. | 137/595 |
| 5,511,385 | A | * | 4/1996 | Drew et al. | 62/172 |
| 5,704,218 | A | * | 1/1998 | Christians et al. | 62/172 |
| 5,956,960 | A | * | 9/1999 | Niggeman | 62/172 |
| 6,250,097 | B1 | * | 6/2001 | Lui et al. | 62/402 |
| 6,257,003 | B1 | * | 7/2001 | Hipsky | 62/88 |
| 6,516,873 | B1 | * | 2/2003 | Haugen | 165/145 |
| 6,526,775 | B1 | * | 3/2003 | Asfia et al. | 62/402 |
| 6,653,004 | B1 | * | 11/2003 | Barber | 429/19 |

* cited by examiner

*Primary Examiner*—William C. Doerrler
(74) *Attorney, Agent, or Firm*—Carlson, Gaskey & Olds, PC

(57) ABSTRACT

An air generation unit includes first and second air cycle machines (ACMs), each having first and second turbines. A manifold is arranged between the first and second ACMs and is in fluid communciation with each of the first and second turbines of the first and second ACMs. A condenser is arranged between the ACMs and is in fluid communication with the manifold. First and second valves are disposed within the manifold and control flow of air between the turbines and the condenser. An actuator is assembly is connected to the valves for moving the valves between a plurality of positions. The valves selectively close off or prevent the flow of air from the turbines of one of the ACMs in the event that the ACM is not needed or malfunctions.

13 Claims, 6 Drawing Sheets

MANIFOLD FOR PACK AND A HALF CONDENSING CYCLE PACK WITH COMBINED HEAT EXCHANGERS

This application is a Continuation-In-Part of U.S. application Ser. No. 10/387,139; filed Mar. 12, 2003, entitled "Pack And A Half Condensing Cycle Pack With Combined Heat Exchangers".

BACKGROUND OF THE INVENTION

This invention relates to an air generation unit (AGU) suitable for an aircraft, and more particularly, the invention relates to a pack and a half air generation unit configuration utilizing two air cycle machines (ACM) with each preferably having two turbines.

AGUs typically include at least one ACM and at least one heat exchanger that receives air from a pressurized air source, such as bleed air from an engine, to provide cooled air to the aircraft cabin and cockpit. The AGUs may be packaged within the wings and/or tail section of the aircraft. Accordingly, it is desirable to provide an AGU having a very small package to limit the amount of aircraft structure that must be removed to accommodate the AGU. Furthermore, the AGU must provide sufficient cooling for the size of the aircraft.

A pack and a half AGU has been developed for use in a first prior art system in which two ACMs share a common heat exchanger. The pack and a half configuration provides increased cooling and smaller packaging than two separate AGUs each having their own heat exchanger. The system utilizes a three wheel air cycle machine having a fan, a compressor, and a single turbine.

The prior art AGU includes a heat exchanger having primary and secondary heat exchangers. Bleed air is taken from an intermediate or high pressure stage of a turbine engine. The bleed air is pre-cooled within the primary heat exchanger with the heat being rejected to ram air and then communicated to the compressor of the ACM. After compression, the air is communicated through a secondary heat exchanger to a condenser. Condensed water vapor is extracted by a water collector, and the dehumidifier air is sent to turbine where the air is expanded to generate cold air. The cold air is sent to a mixer and to a distribution system in the aircraft.

A second prior art system utilizes AGUs with a single ACM and single heat exchanger. The system is a four wheel configuration that includes a fan, a compressor, and first and second turbines. The operation of the AGU is similar to the first prior art system AGU, but the second turbine receives the cold air from the first turbine and further expands the cold air to produce subfreezing air. The second turbine produces air sufficient to cool larger aircrafts.

Very large commercial aircrafts are being developed capable of carrying up to 1,000 passengers or more. These large aircraft require AGUs capable of producing very cold temperatures. However, the design constraints for the aircraft require very small packaging with very high reliability. The first prior art system AGU configuration produces conditioned air that is not sufficiently cold for such a large aircraft. The second prior art system AGU configuration provides sufficiently cold air, however, up to four or more AGUs would be required for such a large aircraft, which would necessitate removing significant aircraft structure and would significantly increase weight.

The pack and a half configuration of the first prior art system utilizes solenoid valves external to the manifold to control the flow of air from the turbines to the manifold, which distributes air to and from the condenser. In the event that one of the ACMs is not needed or is malfunctioning, the unwanted ACM is shut down or idled. A dedicated solenoid valve is closed to prevent leakage from the turbine of the unwanted ACM, which would result in large operating inefficiencies. Accordingly, each turbine in a prior AGU has a solenoid associated with it. Hoses and band clamps connect each of the solenoids to the manifold in the AGU. Moreover, numerous wires are used to connect each of the solenoids to a controller. As a result, with prior art AGUs, the number of components greatly increases as the number of turbines in an AGU increases resulting in higher costs and reduced reliability.

Therefore, what is needed is an improved AGU having a small package, increased reliability, and sufficiently cold air for the needs of a large aircraft.

SUMMARY OF THE INVENTION AND ADVANTAGES

The present invention provides an air generation unit including first and second air cycle machines (ACMs), each having first and second turbines. A manifold is arranged between the first and second ACMs and is in fluid communication with each of the first and second turbines of the first and second ACMs. A condenser is arranged between the ACMs and is in fluid communication with the manifold. First and second valves are disposed within the manifold and control flow of air between the turbines and the condenser. An actuator assembly is connected to the valves for moving the valves between a plurality of positions. The valves selectively close off or prevent the flow of air from the turbines of one of the ACMs in the event that the ACM is not needed or malfunctions.

Accordingly, the above invention provides an improved AGU having a small package, increased reliability, and sufficiently cooled air for the needs of a large aircraft.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
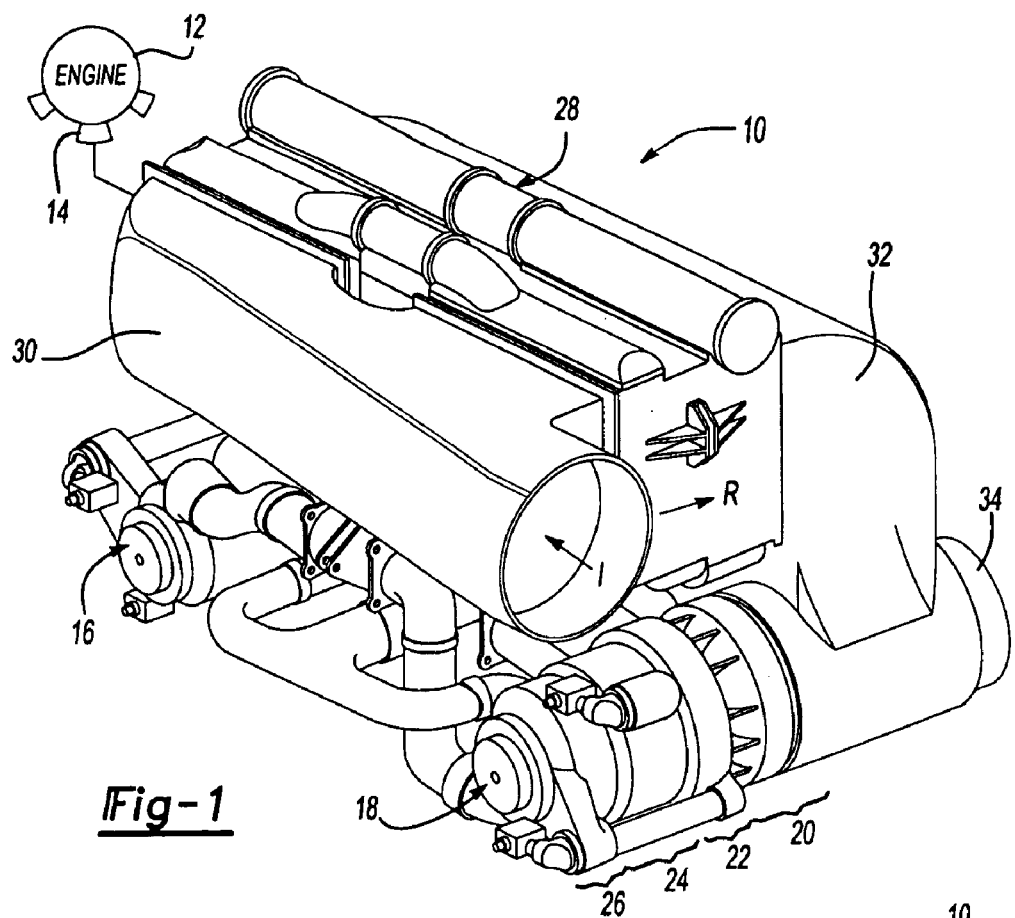
FIG. 1 is a front perspective view of the present invention AGU.
Figure 2:
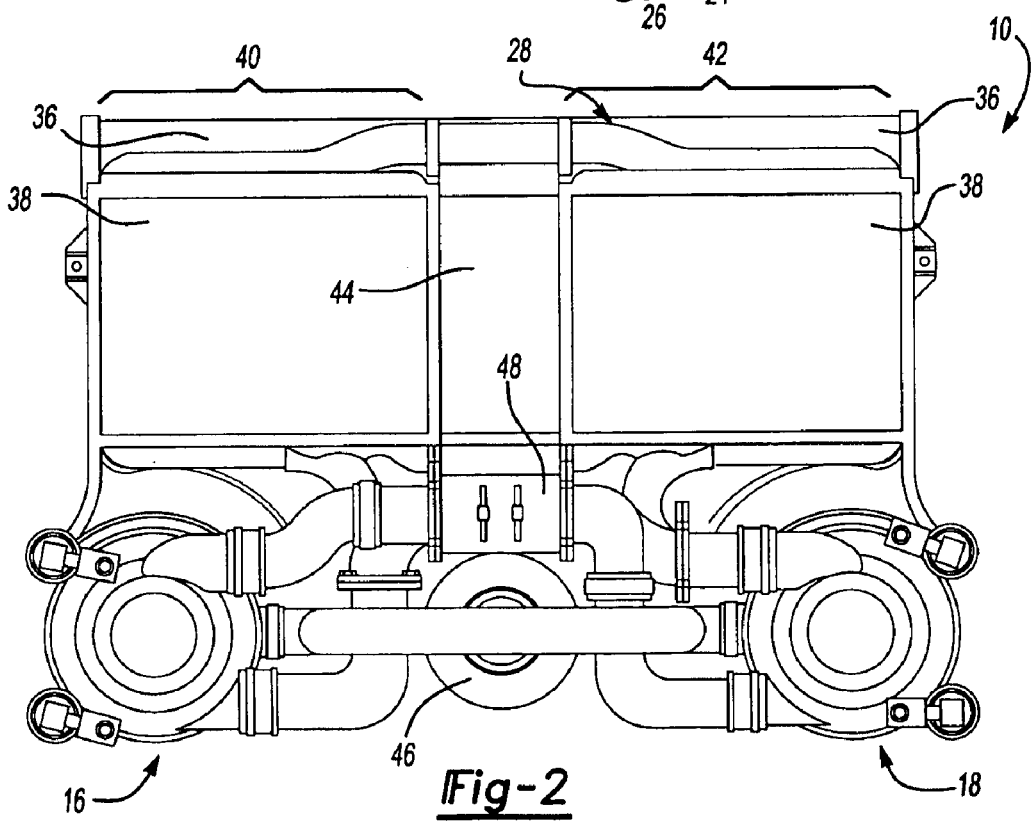
FIG. 2 is a side elevational view of the AGU shown in FIG. 1.
Figure 3:
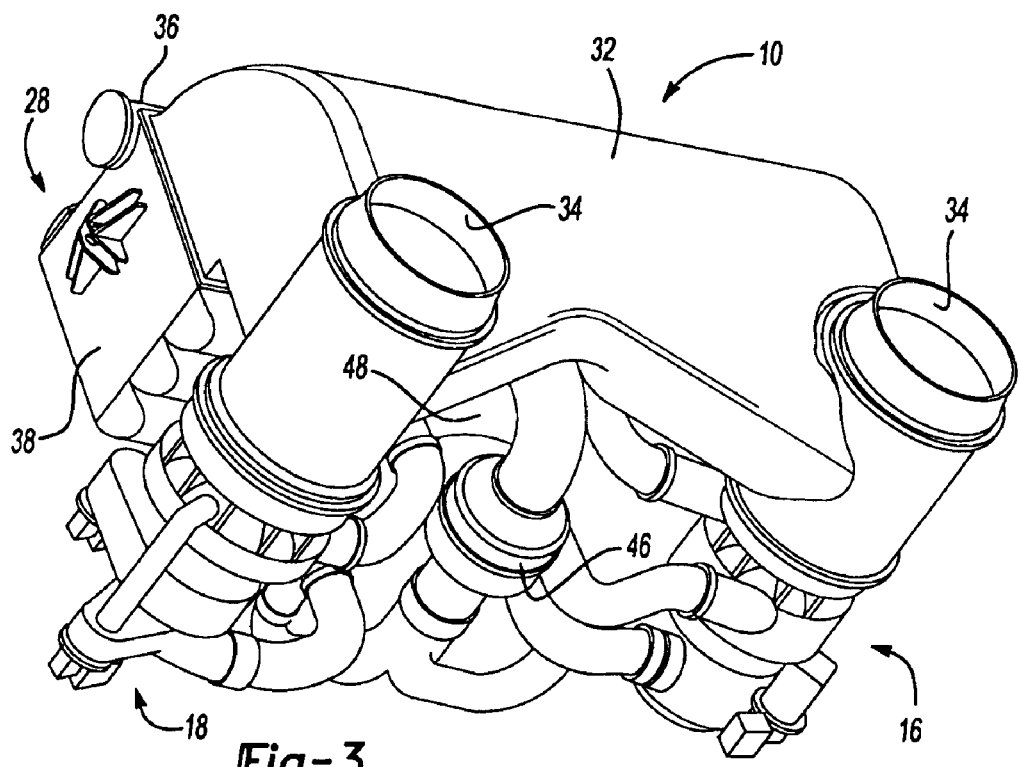
FIG. 3 is a bottom perspective view of the opposing side of the AGU shown in FIG. 2.

An air generation unit (AGU) 10 is shown in FIGS. 1–3. The AGU 10 receives pressurized air from an intermediate or high pressure stage of an engine 12 through a bleed valve 14. The pressurized air is conditioned by the AGU 10 to provide conditioned air to the aircraft.

The present invention AGU 10 includes first 16 and second 18 air cycle machines (ACM). The present invention ACMs 16 and 18 are a four wheel configuration including a fan 20, a compressor 22, and first 24 and second 26 turbines. The ACMs 16 and 18 are mechanically mounted to a shared or common heat exchanger 28, which is mounted to the aircraft frame. A ram air inlet header 30 provides ram air to the heat exchanger 28 with the ram air exiting the heat exchanger 28 through ram air outlet header 32 and ram outlets 34. The fan 20 helps to draw the air through the headers 30 and 32.

As best shown in FIG. 1, the ram air enters the header 30 along a path I. The ram air passes through the heat exchanger 28 in a ram air flow path R, which is transverse to the path I defined by the inlet header 30. Referring now to FIG. 2, the heat exchanger 28 includes a primary 36 and secondary 38 heat exchangers. The primary heat exchanger 36 is an air-to-air heat exchanger that cools the bleed air from the engine 12 prior to being compressed by the compressor 22. The secondary heat exchanger 38 cools the compressed air from the compressor 22 prior to being sent to the turbines 24 and 26 for expansion and further cooling. The heat exchanger 28 is divided into first 40 and second 42 heat exchanger portions in the no flow direction to reduce the thermal stress on the heat exchanger 28, which is the structural back bone of the AGU 10. Specifically, the flow direction is indicated by the path I through the ram air inlet header 30. Dividing the heat exchanger 28 along the direction of the path I reduces the thermal stresses on the heat exchanger 28 based upon mathematical models. However, splitting the heat exchanger 28 in the direction of the ram air flow R as it passes through the heat exchanger 28 has a less beneficial effect on the thermal stresses of the heat exchanger. The reduced thermal stress achieved by the split heat exchanger 28 extends the life of the heat exchanger 28 and AGU 10.

The condenser 44 is arranged between the first 40 and second 42 heat exchanger portions so that the condenser 44 may be shared by the ACM 16 and 18. The condenser 44 generates water vapor capable of being collected by the water collector 46 to dehumidify the air received from the secondary heat exchanger 38. The water collector 46 is positioned beneath the condenser 44 to provide more efficient collection of water vapor by taking advantage of gravity. The condenser 44 and collector 46 are arranged centrally between the ACM 16 and 18. A manifold 48 may be mounted between the condenser 44 and water collector 46 to provide an efficient centralized connection between the ACMs 16 and 18, and other components of the AGU. As a result, many hoses and couplings may be integrated into the structure of the manifold 48, and other centrally located components to increase reliability.

Figure 4:
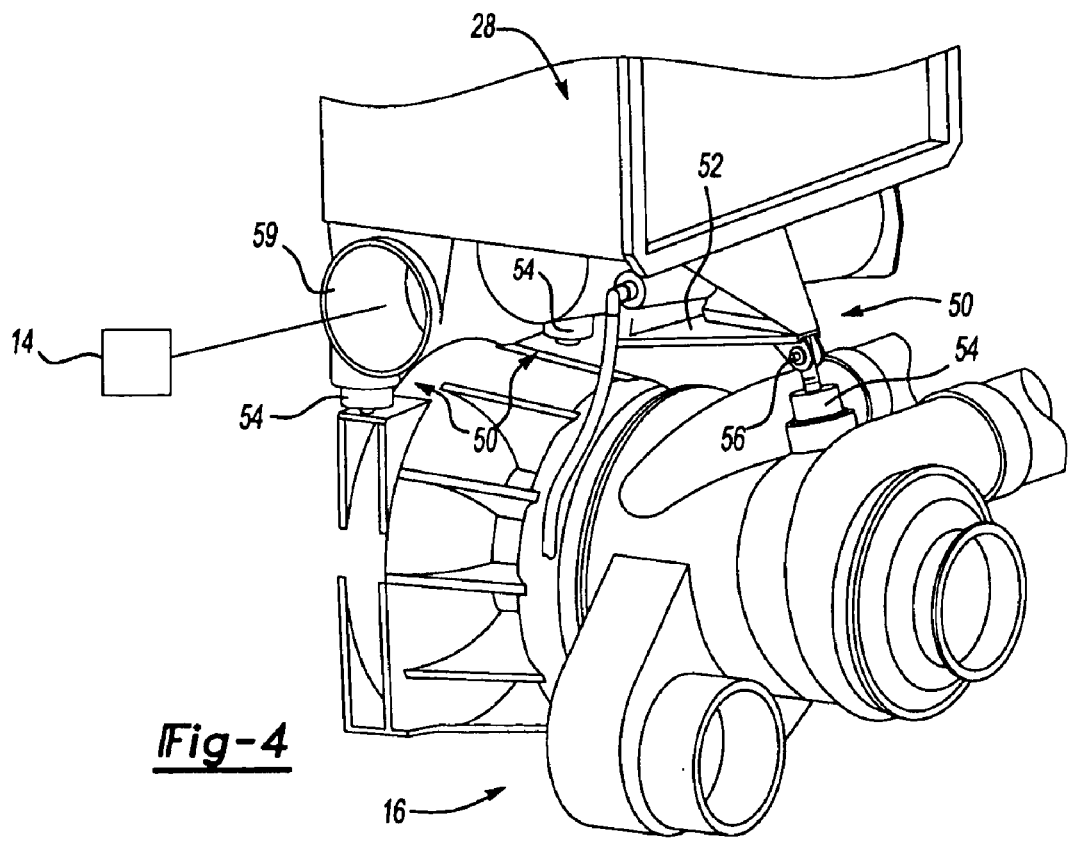
FIG. 4 is an enlarged perspective view depicting the mounts between the heat exchanger and ACMs.

FIG. 4 depicts the mounts between the ACM 16 and 18 and the heat exchanger 28 that further reduce the stress on the heat exchanger 28 and isolate the vibrations produced by the ACM 16 and 18 and prevent them from being transmitted to the aircraft through the heat exchanger 28. The mounts 50 may be arranged in a triangular pattern between each of the ACM 16 and 18 and the heat exchanger 28. Specifically, the mounts 50 may be arranged between each ACM and its respective heat exchanger portion 40 and 42. The mounts 50 may include a bracket 52 connected to the heat exchanger 28 interconnected via a clevis 56 to a flexible isolator 54 mounted on the ACMs 16 and 18. For other mounts 50, the bracket 52 and clevis 56 may not be necessary. The heat exchanger 28 may be mounted to the air frame by frame mounts 57, best shown in FIG. 5.

Figure 5:
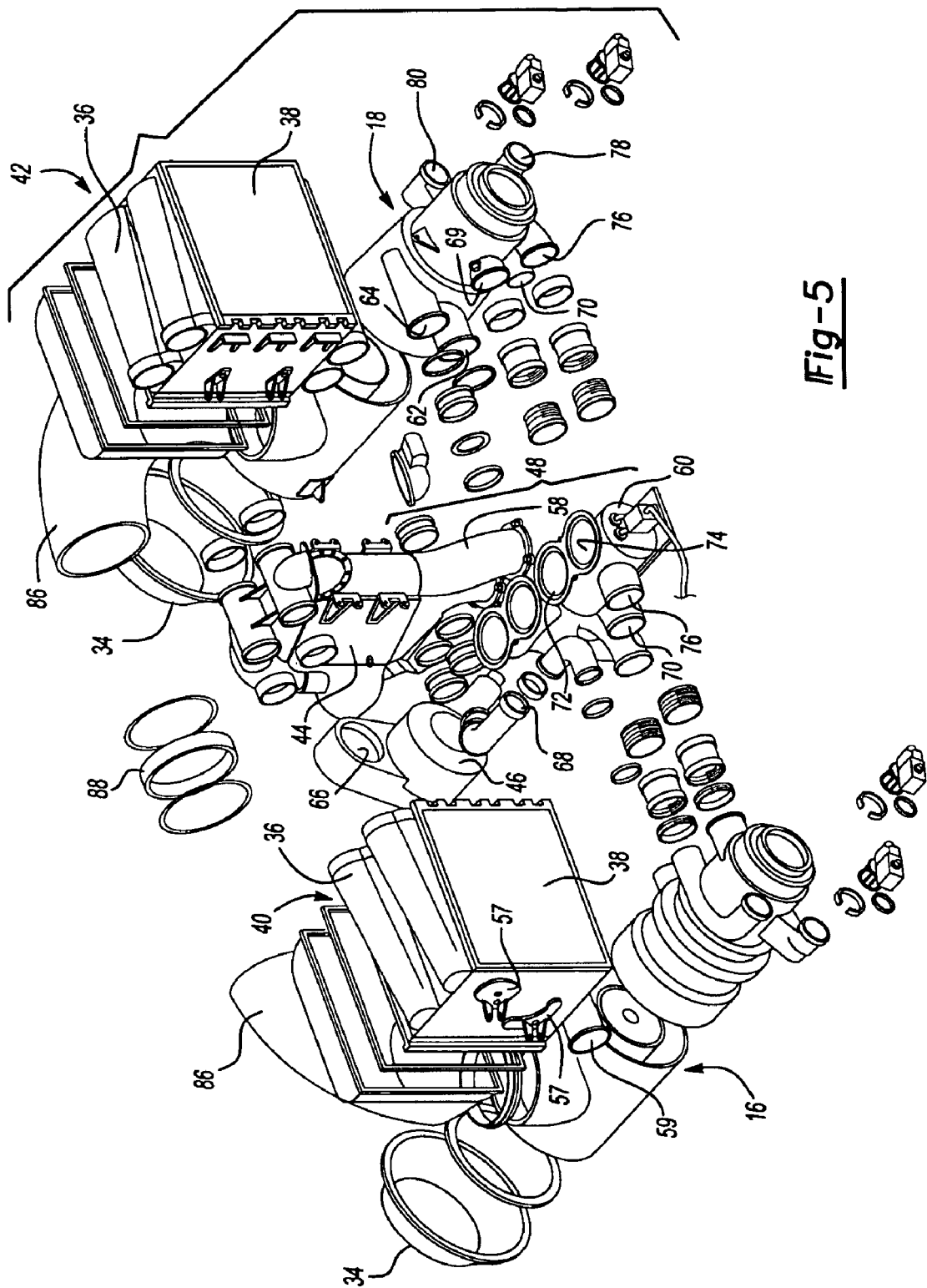
FIG. 5 is a side exploded perspective view of a present invention AGU.
Figure 6:
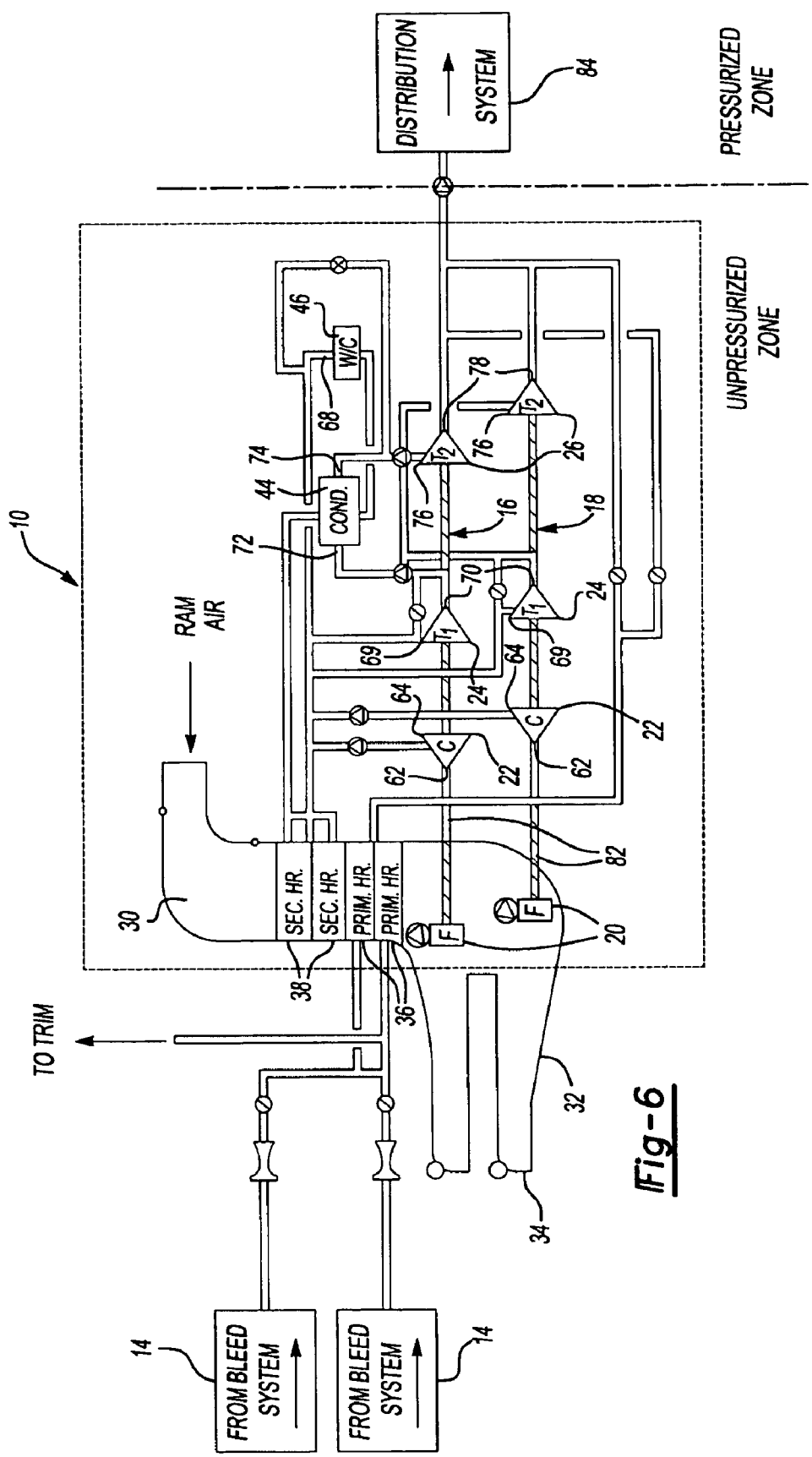
FIG. 6 is a schematic view of the present invention AGU.

With continuing reference to FIG. 5, pressurized air from the engine enters through a bleed air inlet 59. The high temperature bleed air passes through the primary heat exchanger 36 to cool the air to a temperature that is suitable for use with aluminum components. The cooled air from the primary heat exchangers 36 enters the compressor inlet 62 where it is compressed by the compressor 22 to provide compressed air. The temperature of the compressed air has been raised by the compressor 22 such that it must be passed through a secondary heat exchanger 38. The compressed air exits the compressor 22 through the compressor outlet 64 and passes into the secondary heat exchanger 38. The cooled air from the secondary heat exchanger 48 is communicated to the condenser 44 to form water vapor of sufficient character to be collected the water collector 46. The dehumidified air exits the water collector outlet 68 and enters the first turbine inlet 69. The dehumidified air is expanded by the first turbine 24 to produce a first conditioned air having a first temperature that may be as low as approximately 34° F.

The manifold 48 may include an upper 58 and lower 60 manifold portion secured to one another. The manifold 48 is centrally located between the ACMs and integrates numerous passageways that in the prior art have typically been defined by hoses secured between the ACM and other AGU components. The conditioned air from the first turbine outlet 70 is communicated through the lower manifold 60 and sent to the condenser 44 through condenser cold inlet 72. The condenser 44 and water collector 46 remove additional moisture from the conditioned air from the first turbine 24. The further dehumidified air is communicated through the manifold 48 through condenser cold outlet 74 into the second turbine inlet 76 where the air is further expanded by the second turbine 26. The conditioned air temperature produced by the second turbine 26 is lower than the conditioned air temperature produced by the first turbine 24. The conditioned air produced by the second turbine 26 may be of subfreezing temperatures, which better enables the AGU 10 to cool a large aircraft.

Air from a second turbine conditioned air outlet is sent to a mixer and distribution system 84 for cooling of the aircraft. The second turbine conditioned air outlet 78 may have a first turbine air conditioned air outlet and other air sources communicated therewith to adjust the humidity and temperature of the air sent to the mixer and distribution system 84.

The ACMs 16 and 18 are four wheeled machines having a shaft 82 supporting the fan 20, compressor 22, and first 24 and second 26 turbines. The fan 20 is arranged within the ram air flow. The fan 20 pulls air through the heat exchangers 28 if the aircraft is not moving. To facilitate servicing and assembly of the AGU 10, the ram air outlet header 32 may comprise ram air outlet header portion 86 secured to one another centrally by a seal 88.

Referring to FIGS. 7–9B, a portion of the manifold 48 is depicted schematically. The manifold 48 includes opposing first passages 90, each of which defines a first turbine outlet 70 that is in fluid communication with the first turbines 24 of the first 16 and second 18 ACMs. The manifold 48 also includes opposing the second passages 92, each of which defines second turbine inlets 76 that are in fluid communication with the second turbines 26 of the first 16 and second 18 ACMs. The manifold 48 includes a condenser inlet passage 94 fluidly connected to the first passages 90 at a first intersection 95. A condenser outlet passage 96 is fluidly connected to the second passages 92 at a second intersection 97. The passages 94 and 96 are in fluid communication with the condenser 44.

Figure 7:
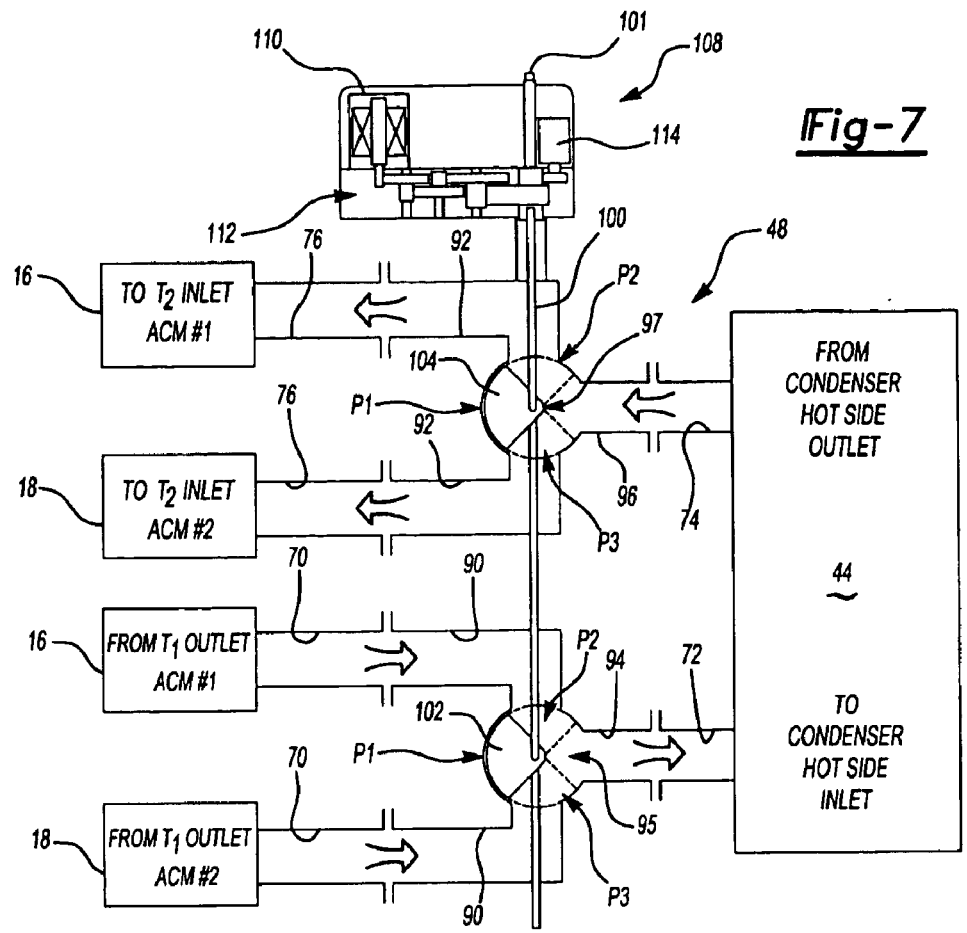
FIG. 7 is a schematic view of the present invention manifold.

Referring to FIG. 7, first 102 and second 104 gate valves are respectively arranged at the first 95 and second 97 intersections. The valves 102, 104 are supported by a common shaft 100 that is rotated between a plurality of angular positions by an actuator assembly 108. The valves 102, 104 selectively control the flow of air from the ACMs 14, 16 to the condenser 44 to enable efficient operation of the AGU 10. For example, only one of the ACMs may be needed during a cold day pull-up operation, or one of the ACMs may malfunction. As a result, it would be desirable to block the flow between the unwanted ACM and the condenser 44, which would avoid an air leak that would adversely affect the efficiency of the AGU 10.

In a first position P1, the valves 102, 104 are arranged in a position to permit air flow between both ACMs 14, 16 and the condenser 44. In a second position P2, flow between the first ACM 14 and the condenser 44 is blocked while maintaining airflow between the second ACM 16 and the condenser 44. In a third position P3, flow between the second ACM 16 and the condenser 44 is blocked while maintaining airflow between the first ACM 14 and the condenser 44. The valves 102, 104 need only be rotated 45 degrees between the first position P1 and the second P2 and third P3 positions. The valves 102, 104 may be pie-shaped or any other suitable configuration.

The actuator assembly 108 includes an electric stepper motor 110 that is coupled to the shaft 100 through a gear train 112, which multiples the torque provided by the motor 110 to reduce the size of the motor needed. A rotationally variable displacement transducer (RVDT) 114 may monitor the rotational position of the shaft 100. The motor 110 and RVDT 114 may be electrically connected to a controller (not shown) to monitor and control the position of the valves 102, 104 to integrate their function into the overall operation of the AGU 10. For example, ACM speeds and system temperatures may be used to monitor the correct operation of the valves 102, 104. An end 101 of the shaft 100 may extend from the actuator assembly 108 or some other suitable location to permit a manual adjustment to the rotational position of the valves 102, 104. A graphic position indicator may be arranged adjacent to the end 101 to indicate the position of the valves 102, 104 to a service technician.

Figure 8:
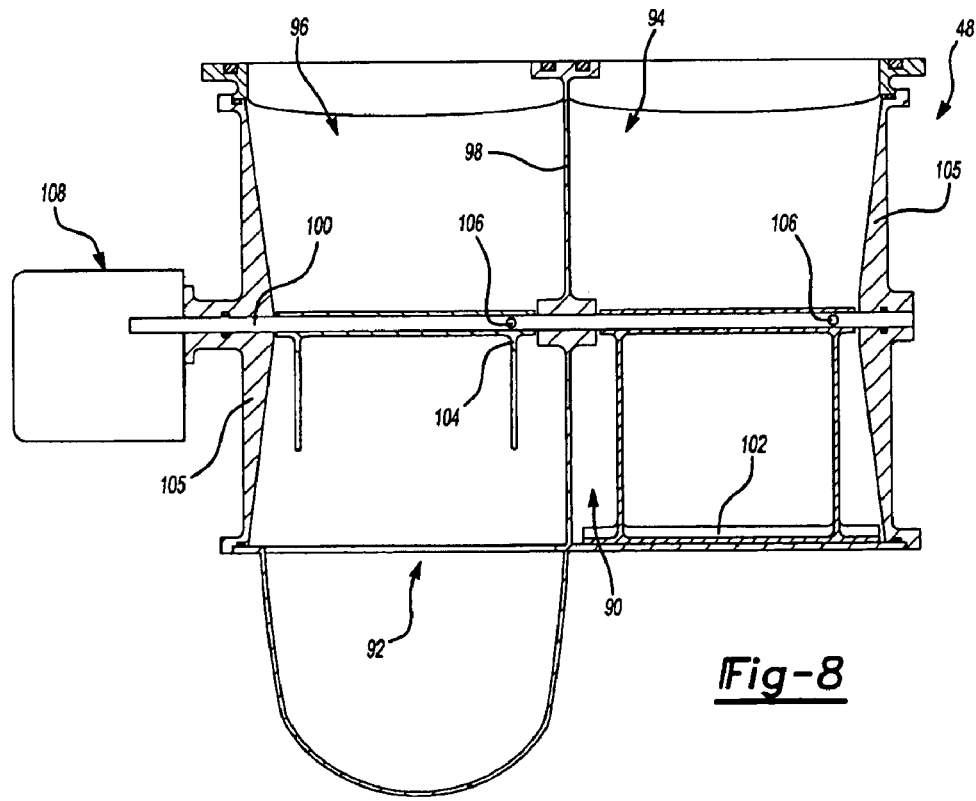
FIG. 8 is a cross-sectional view through the present invention manifold.
Figure 9A:
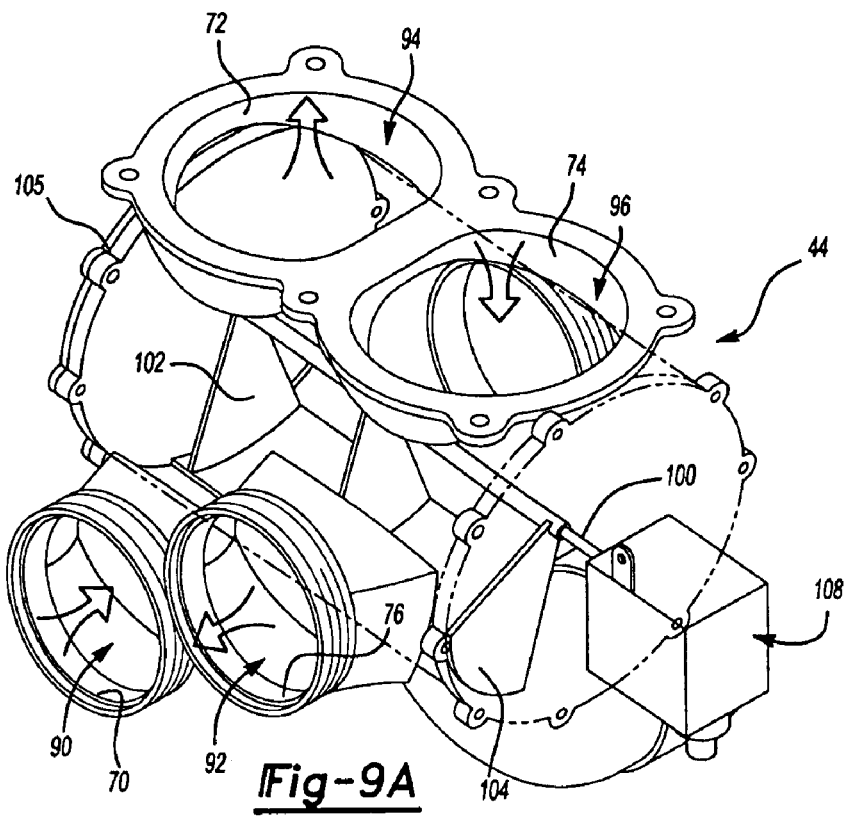
FIG. 9A is a side perspective view of the present invention manifold with a portion of the housing broken away.
Figure 9B:
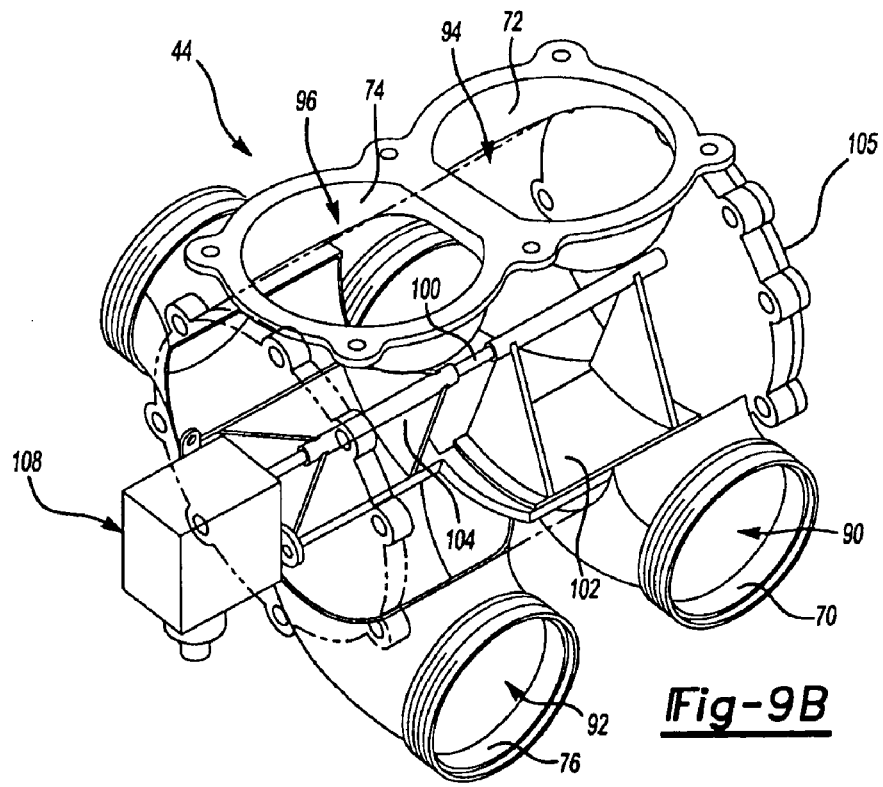
FIG. 9B is a perspective view of the other side of the manifold shown in FIG. 9A with a portion of the housing broken away.

Referring now to FIGS. 8–9B, a vertical cross-section is shown through the manifold 48. The manifold 48 defines a housing that may be formed by sand casting, investment casting, or any other suitable process, using aluminum or any other suitable material. A septum 98 divides the first passages 90 and intersection 95 from the second passages 92 and intersection 97 to separate the flow between the first 24 and second 26 turbines and the condenser 44. End caps 105 are secured to the body of the manifold 48 at opposing ends using a plurality of fasteners. The end caps 105 facilitate assembly and servicing of the manifold 48.

The shaft 100 is supported by bores within the end caps 105 and the septum 98, which is best shown in FIG. 8. The bores may include bushings and seals as desired to reduce friction and air leaks. Bearing cooling features may be used as needed for particular high temperature applications. The valves 102, 104 are secured to the shaft 100 by pins 106 to enable installation of the shaft 100 and valves 102, 104 into the manifold 48. Sealing between the valves 102, 104 and manifold housing may not be needed depending upon the acceptable threshold for leakage for particular applications.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An air generation unit comprising:
   first and second air cycle machines each having first and second turbines;
   a manifold in fluid communication with said first and second turbines of said first and second air cycle machines;
   a condenser in fluid communication with said manifold;
   first and second valves disposed within said manifold controlling flow of air between said turbines and said condenser; and
   an actuator assembly connected to said valves for moving said valves between a plurality of positions.

2. The unit according to claim 1, wherein said manifold includes a pair of opposing first passages fluidly connected at a first intersection with each of said first passages fluidly connected to one of said first turbines, and said manifold including a pair of opposing second passages fluidly connected at a second intersection with each of said second passages fluidly connected to one of said second turbines, said first and second valves respectively arranged at said first and second intersections.

3. The unit according to claim 2, wherein said manifold includes a condenser inlet passage in fluid communication with said first intersection, and said manifold includes a condenser outlet passage in fluid communication with said second intersection, said first passages fluidly connected to outlets of said first turbines, and said second passages fluidly connected to inlets of said second turbines.

4. The unit according to claim 1, wherein said plurality of positions includes a first position fluidly connecting said turbines of said first and second air cycle machines to said condenser, a second position fluidly connecting said first air cycle machine turbines to said condenser and blocking said second air cycle machine turbines from said condenser, and a third position fluidly connecting said second air cycle machine turbines to said condenser and blocking said first air cycle machine turbines from said condenser.

5. A manifold for an air generation unit comprising:
   a manifold having opposing first passages and opposing second passages, said manifold including a condenser inlet passage in fluid communication with said opposing first passages forming a first intersection therewith, and a condenser outlet passage in fluid communication with said opposing second passages forming a second intersection therewith;
   first and second valves disposed within said manifold respectively arranged in said first and second intersections; and
   an actuator assembly connected to said valves for moving said valves between a plurality of positions for controlling flow of air between said passages.

6. The manifold according to claim 5, wherein said valves are supported by a common shaft with said actuator assembly coupled to said shaft.

7. The manifold according to claim 6, wherein said actuator assembly includes an electric stepper motor driving said shaft.

8. The manifold according to claim 7, wherein a gear train is interconnected between said stepper motor and said shaft to provide increased torque to said shaft.

9. A manifold for an air generation unit comprising:

a manifold having opposing first passages and opposing second passages, said manifold including a condenser inlet passage in fluid communication with said opposing first passages forming a first intersection therewith, and a condenser outlet passage in fluid communication with said opposing second passages forming a second intersection therewith;

first and second valves disposed within said manifold respectively arranged in said first and second intersections;

an actuator assembly connected to said valves for moving said valves between a plurality of positions for controlling flow of air between said passages, wherein said valves are supported by a common shaft with said actuator assembly coupled to said shaft; and a rotationally variable displacement transducer coupled to said shaft for detecting an angular position of said shaft.

10. The manifold according to claim 6, wherein an end of said shaft extends from a housing permitting manual adjustment of said valves between said positions.

11. A manifold for an air generation unit comprising:

a manifold having opposing first passages and opposing second passages, said manifold including a condenser inlet passage in fluid communication with said opposing first passages forming a first intersection therewith, and a condenser outlet passage in fluid communication with said opposing second passages forming a second intersection therewith;

first and second valves disposed within said manifold respectively arranged in said first and second intersections;

an actuator assembly connected to said valves for moving said valves between a plurality of positions for controlling flow of air between said passages; and wherein said opposing first passages include opposing first turbine outlets and said opposing second passages include opposing second turbine inlets, said manifold having a first side including one of said first turbine outlets and one of said second turbine inlets, and a second side including the other of said first turbine outlets and the other of said second turbine inlets.

12. The manifold according to claim 11, wherein said plurality of positions includes a first position fluidly connecting first and second sides to said condenser, a second position fluidly connecting said first side to said condenser and blocking said second side from said condenser, and a third position fluidly connecting said second side to said condenser and blocking said first side from said condenser.

13. The manifold according to claim 12, wherein said first and second positions are angularly spaced from one another approximately 45 degrees, and said first and third positions are angularly spaced from one another approximately 45 degrees.

* * * * *